(12) United States Patent
Hagar

(10) Patent No.: US 6,886,389 B1
(45) Date of Patent: May 3, 2005

(54) SYSTEMS AND METHODS FOR DETECTING AND LOCATING LEAKS IN INTERNAL PRESSURE VESSELS

(75) Inventor: Charles E. Hagar, Manchester, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/732,865

(22) Filed: Dec. 10, 2003

(51) Int. Cl.[7] .............................................. G01M 3/04
(52) U.S. Cl. ........................ 73/40.7; 73/49.2; 73/49.3
(58) Field of Search ................................ 73/40.7, 49.2, 73/49.3

(56) References Cited

U.S. PATENT DOCUMENTS

| | | | | |
|---|---|---|---|---|
| 2,608,855 A | * | 9/1952 | Jacobs ........................ 73/40.7 |
| 3,645,816 A | * | 2/1972 | Billias et al. ................. 156/94 |
| 3,683,675 A | * | 8/1972 | Burton et al. ................. 73/40.7 |
| 3,737,125 A | * | 6/1973 | Farmer .................... 244/135 B |
| 4,175,424 A | * | 11/1979 | Bimond et al. .............. 73/49.2 |
| 4,413,503 A | * | 11/1983 | Olivieri ....................... 73/40.7 |
| 4,424,708 A | * | 1/1984 | Meuleman ..................... 73/40 |
| 4,773,256 A | * | 9/1988 | Saulgeot ...................... 73/40.7 |
| 5,081,864 A | * | 1/1992 | Zaim ........................... 73/49.2 |
| 5,095,737 A | * | 3/1992 | Sharp .......................... 73/49.2 |
| 5,267,468 A | * | 12/1993 | Zoccoletti et al. ............. 73/40 |
| 5,335,535 A | * | 8/1994 | Ruthrof et al. .............. 73/40.7 |
| 2002/0112527 A1 | * | 8/2002 | Nadin ......................... 73/49.2 |

FOREIGN PATENT DOCUMENTS

| | | | | |
|---|---|---|---|---|
| GB | 2000300 A | * | 6/1977 | |
| JP | 57153236 A | * | 9/1982 | ................. 73/40.7 |
| JP | 57194329 A | * | 11/1982 | ................. 73/40.7 |
| JP | 59176640 A | * | 10/1984 | ................. 73/40.7 |
| JP | 62269032 A | * | 11/1987 | ................. 73/40.7 |

* cited by examiner

*Primary Examiner*—Michael Cygan
(74) *Attorney, Agent, or Firm*—Harness Dickey & Pierce P.L.C.

(57) ABSTRACT

Systems and methods for detecting and locating leaks in internal pressure vessels. A method generally includes forming a pressurizing cavity external to and adjacent an internal pressure vessel. A pressurized fluid is injected into the pressurizing cavity to cause pressurized fluid to flow from the pressurizing cavity through a leak into the internal pressure vessel. The internal pressure vessel is monitored to detect leakage of pressurized fluid into the internal pressure vessel.

24 Claims, 5 Drawing Sheets

SYSTEMS AND METHODS FOR DETECTING AND LOCATING LEAKS IN INTERNAL PRESSURE VESSELS

FIELD OF THE INVENTION

The present invention generally relates to leak detection in pressure vessels, and more particularly (but not exclusively) to systems and methods for detecting and locating leaks in internal pressure vessels with externally applied pressurized fluid.

BACKGROUND OF THE INVENTION

Internal aircraft fuel tanks sometimes develop leaks which are usually detected either by observing fuel dripping from the cavity drain of the fuel tank and/or during manufacturing when the fuel tank fails an internal pressure decay test. Once a leak has been detected, the leak must be isolated and located, which is normally a rather timely and costly process.

To pinpoint a leak in an internal fuel tank, an exemplary process includes first isolating the fuel tank from the fuel system by removing the plumbing and capping the fittings and connections within the fuel tank. This alone can be a rather timely operation as some existing fuel cells have well over one hundred fittings to which internal caps must be added. After the fuel tank has been isolated accordingly, air pressure is introduced into the fuel tank itself, usually at about four pounds per square inch (4.0 psig), and the source providing the air pressure is turned off. The pressure within the fuel tank is monitored over a period of time, for example, on a test cart gage to check for pressure decay. If the pressure decay rate is higher than that which is allowed by the applicable process specifications, the fuel tank leaks and thus will not hold fuel. Eventually, fuel will leak from the external cavity drain of the fuel tank.

In an attempt to locate an origin of a detected leak, various methods can be employed including incremental refueling and defueling of the fuel tank, and inspection of randomly selected seals in an attempt to identify a possible O-ring leak in any one of the numerous fittings. Each of these processes can require an extensive amount of time without any guarantee that the origin of the detected leak will be found. Indeed, it is not uncommon that the leak's origin will not be found in which case the fuel tank will have to be removed and replaced. Removing and replacing a fuel tank, however, can also be a rather timely and costly process.

SUMMARY OF THE INVENTION

Systems and methods for detecting and locating leaks in internal pressure vessels. In a preferred implementation, the invention provides a method of detecting leaks in a fuel tank without having to remove the fuel tank from the mobile platform. The fuel tank is disposed within a cavity defined by supporting structure of the mobile platform. The method generally includes sealing a cavity annulus defined generally between the fuel tank and the mobile platform supporting structure; introducing pressurized fluid into the cavity annulus to cause pressurized fluid to flow from the cavity annulus through a leak into the fuel tank; and monitoring the fuel tank to detect leakage of pressurized fluid into the fuel tank. Accordingly, the fuel tank can remain disposed within the cavity defined by the mobile platform supporting structure while the leaks are being detected.

In another preferred implementation, a method of detecting leaks in an internal pressure vessel (which can be but need not be an internal fuel tank of an aircraft) generally includes forming a pressurizing cavity external to and adjacent the internal pressure vessel; introducing pressurized fluid into the pressurizing cavity to cause pressurized fluid to flow from the cavity through a leak into the internal pressure vessel; and monitoring the internal pressure vessel to detect leakage of pressurized fluid into the internal pressure vessel.

In another preferred implementation, the invention provides a method of locating leaks in an internal pressure vessel without having to remove the internal pressure vessel from the cavity defined by supporting structure in which the internal pressure vessel is disposed. The method generally includes sealing a cavity annulus defined generally between the internal pressure vessel and the supporting structure; introducing pressurized fluid into the cavity annulus to cause pressurized fluid to flow from the cavity annulus through a leak into the internal pressure vessel; positioning an isolation cup over a fitting within the internal pressure vessel; and using a detection device in communication with the isolation cup to detect leakage of pressurized fluid into the isolation cup. Accordingly, the internal pressure vessel can remain within the cavity defined by the supporting structure while leaks are being detected and located.

The features, functions, and advantages can be achieved independently in various embodiments and implementations of the present inventions or may be combined in yet other embodiments and implementations.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments and implementations are merely exemplary in nature and is in no way intended to limit the invention, its application, or uses.

According to one aspect, the invention provides methods for detecting in an internal pressure vessel (e.g., an aircraft fuel tank, etc.) without having to remove the internal pressure vessel from the structure (or cavity defined by the structure) in which the internal pressure vessel is disposed. In an exemplary implementation, the method generally includes forming a pressurizing cavity external to and adjacent the internal pressure vessel. A pressurized fluid (e.g., a pressurized helium gas, etc.) is introduced into the pressurizing cavity at least until the pressurizing cavity is sufficiently pressurized for causing pressurized fluid to flow from the pressurizing cavity through a leak into the internal pressure vessel. The interior of the internal pressure vessel is monitored (e.g., with a helium detector, etc.) to detect leakage of pressurized fluid into the internal pressure vessel. Fluid leakage into the internal pressure vessel indicates the existence of one or more leaks.

In preferred implementations, the monitoring includes using a helium detector at various locations within the internal pressure vessel (e.g., along the sidewall and/or adjacent fittings and connections within the internal pressure vessel) to pinpoint or locate the points of origin of the fluid leakage into the internal pressure vessel. Accordingly, embodiments of the invention are relatively simple-to-use and highly efficient at locating and pinpointing leaks in internal pressure vessels.

Figure 1:
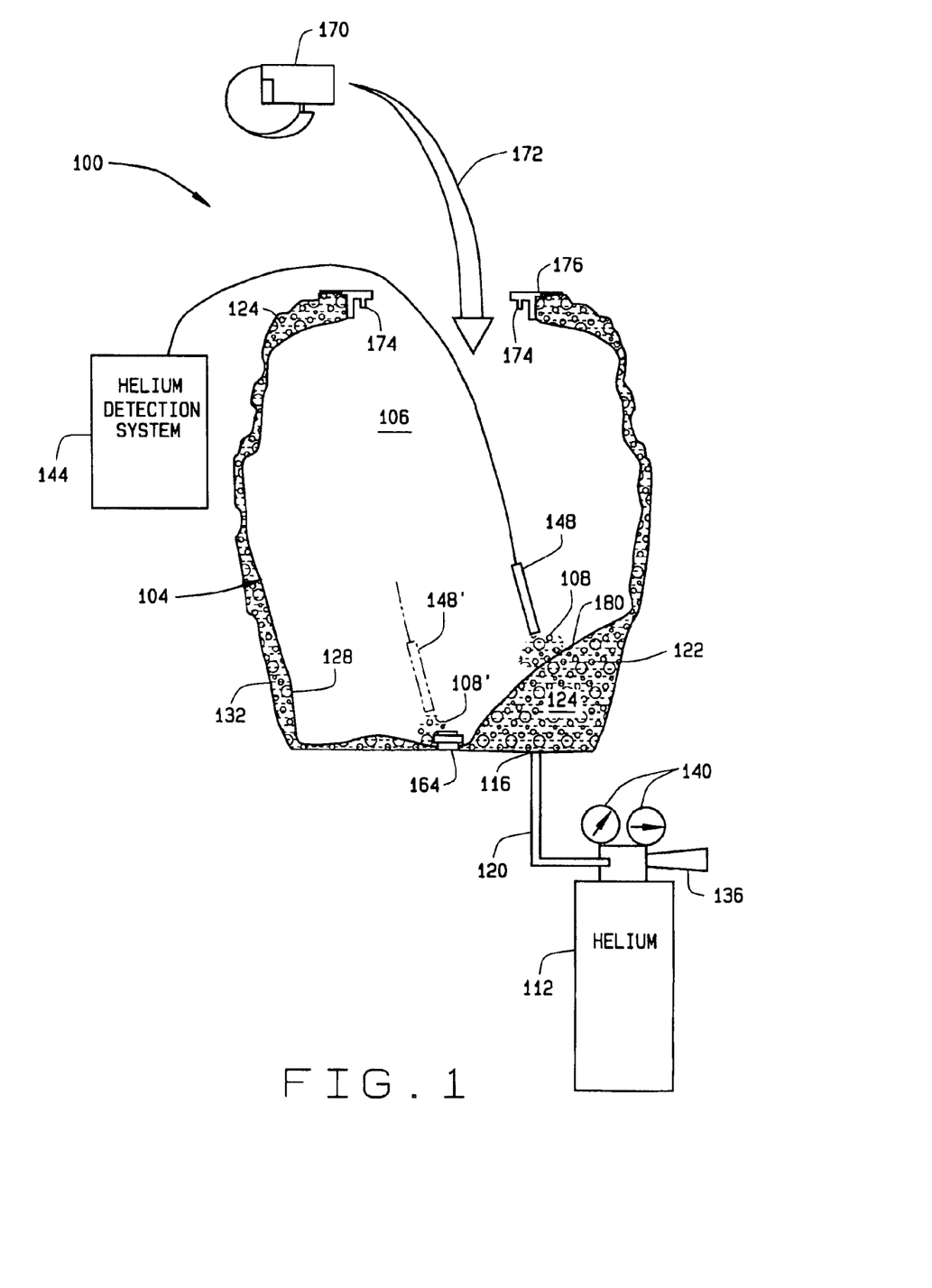
FIG. 1 is a schematic view of a leak detection system according to a preferred embodiment of the invention.

An exemplary system 100 embodying at least one aspect of the invention is illustrated in FIG. 1. As shown, the system 100 is being used in conjunction with an aircraft fuel tank 104 to detect leaks (e.g., 108, 108') in the fuel tank 104. It should be noted, however, that while the system 100 is shown detecting leaks (e.g., leak 108 in a tank wall 180, leak 108' in a fitting 164 having a defective O-ring, etc.) in the aircraft fuel tank 104, embodiments of the invention are applicable to a wide range of internal pressure vessels.

As shown, the system 100 includes a pressurized fluid source 112 which is in communication with the cavity drain 116 of the fuel cell 104 via conduit 120 (e.g., ¼ inch diameter Teflon tubing, stainless steel tubing, etc.). This allows the source 112 to introduce pressurized fluid 122 into the cavity annulus 124. The cavity annulus 124 is an area or space defined between an outer mold line 128 of the fuel cell 104 and an inner mold line 132 of the aircraft structure. The inner mold line 132 defines the space in which the fuel tank 104 is disposed. As described below, the cavity annulus 124 is sufficiently sealed in a substantially fluid tight manner to allow the cavity annulus 124 to be sufficiently pressurized with pressurized fluid from the source 112 for causing pressurized fluid to flow from the cavity annulus 124 through a leak 108, 108' into the fuel cell 104.

In a preferred embodiment, helium gas is selected as the pressurized fluid 122 to be injected into the cavity annulus 124 by the source 112. The selection of gaseous helium is based at least in part on its molecular size. The relatively small helium molecules are highly penetrating and able to pass more readily through leaks than larger sized molecules. In other embodiments, however, other fluids (e.g. other noble gases, etc.) which are preferably nonflammable, non-reactive, and non-contaminating, can be also be used depending on the particular application in which the embodiment is being implemented.

A regulator 136 and gages 140 are also provided to allow for regulation and control of the source 112 and thus pressurization of the cavity annulus 124. In an exemplary embodiment, pressurized helium is regulated to the cavity drain 116 to about 0.50 (pounds per square inches). Alternatively, however, the specific pressure levels and ranges used will depend at least in part on the particular application in which the embodiment is being implemented.

The system 100 includes a detection system 144 for detecting within the fuel tank 104 the presence of pressurized fluid 122 which has leaked from the cavity annulus 124 into the fuel tank 104. As mentioned above, a preferred embodiment injects a pressurized helium gas into the cavity annulus 124. In which case, the detection system 144 includes a helium detector 148. A wide range of helium detection systems and detectors can used including helium leak detectors commercially available from Varian®, Inc. of Palo Alto, Calif.

Figure 2:
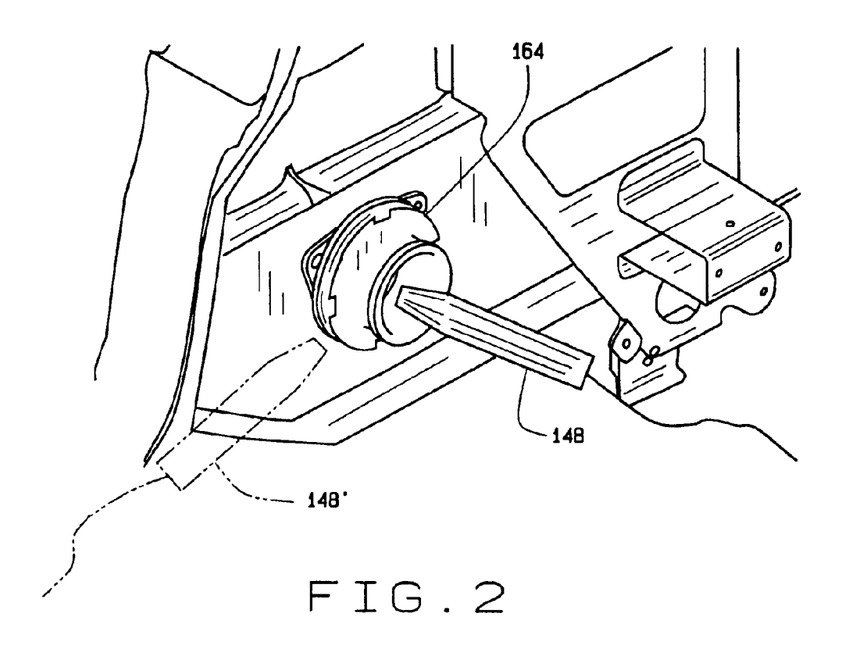
FIG. 2 is a perspective view of a helium detector inspecting a fitting within a fuel tank for helium leakage according to a preferred embodiment of the invention.

In FIG. 2, the helium detector 148 is shown at a first position relative to a fitting 164 within the fuel tank 104 to detect helium leakage. FIG. 2 also shows the helium detector 148' at an alternate or second position relative to the fitting 164 to detect helium leakage.

Figure 3:
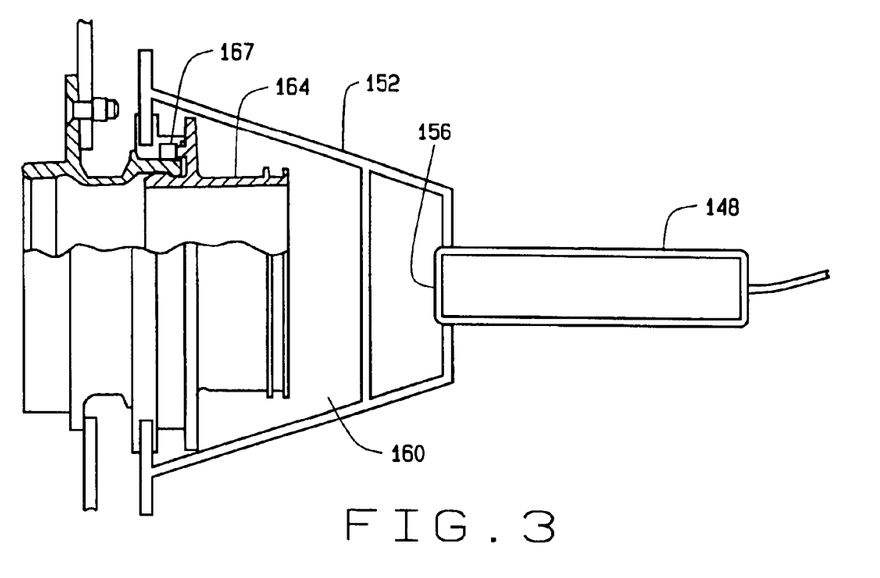
FIG. 3 is a schematic view of a helium detector including an isolation cup which is shown isolating an area over a fitting within a fuel tank according to a preferred embodiment of the invention.
Figure 4:
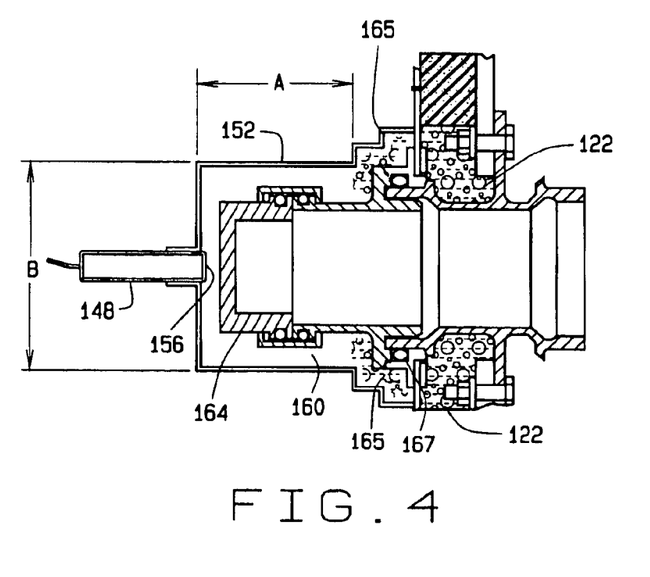
FIG. 4 is a schematic view of a helium detector including an isolation cup which is shown isolating an area over a fitting within a fuel tank according to a preferred embodiment of the invention.

As shown in FIGS. 3 and 4, an isolation cup 152 is in communication with the helium detector 148. The isolation cup 152 can be used to isolate an area 160 (e.g., create a generally fluid tight seal) over a fitting or connection 164 within the fuel tank 104 such that the detection of helium 165 within the isolated area 160 indicates that the fitting 164 leaks, and most likely, includes one or more O-rings 167 that need to be replaced. As seen by comparing FIGS. 3 and 4, the isolation cup 152 can include a variety of shapes and sizes depending at least in part on the particular connection or fitting over which the cup is to be positioned. The isolation cup can reduce the amount of time needed to pinpoint or locate the point of origin of a leak.

Certain embodiments include a plurality of interchangeable isolation cups 152, each of which is adapted to be removably coupled to and in communication with the helium detector 148. The isolation cups 152 can have a variety of sizes and configurations, to adapt or customize the helium detector 148 for a particular connection or fitting over which the cup is to be positioned. By selecting and installing the cup 152 having the most suitable size and configuration for the particular type of fitting or connection over which the cup 152 is to be positioned, the operator can even further improve the efficiency at which leaks are detected and located by the system 100.

By way of example, FIG. 4 illustrates an exemplary configuration for an isolation cup 152 having dimensions A and B, which can vary depending on the configuration (e.g., size and shape) of the particular fitting over which the isolation cup 152 will be positioned. For purposes of illustration, exemplary dimensions for seven different cup sizes for the isolation cup 152 shown in FIG. 4 are set forth below:

| Size No. | A | B |
| --- | --- | --- |
| 1 | 1.75 inches | 1.50 inches |
| 2 | 2.00 inches | 2.50 inches |
| 3 | 2.25 inches | 3.00 inches |
| 4 | 3.25 inches | 4.00 inches |
| 5 | 3.75 inches | 4.00 inches |
| 6 | 4.25 inches | 4.15 inches |
| 7 | 4.5 inches | 3.00 inches |

When the pressurized helium has sufficiently pressurized the cavity annulus 124 and thus substantially engulfed the exterior (defined by the outer mold line 128) of the fuel cell 104, access may be obtained into the fuel cell interior 106 through an access door 168. The access door 168 is typically located on an upper portion (e.g., dorsal deck, wing upper surface etc.) of the aircraft. The helium detector 148, which in various embodiments includes a hand-held probe, can be manually carried into the fuel cell 104 via the access door 168 and be used to detect gas leakage, if any, at points of origin (i.e., the locations from which the leak(s) is originating). Assuming a leak is located, the leak can be repaired (e.g., defective O-rings can be changed and/or a wall 180 of the tank 104 can be repaired) while the tank 104 remains within the aircraft structure, i.e., without having to remove the tank 104 from the aircraft.

With further reference to FIG. 1, the system 100 may also include a suitable ventilation system or blower 170, such as an explosion proof shop blower, etc. The blower 170 can provide continuous airflow (represented by arrow 172) into and/or out of the tank 104 during the helium detection/sniffing process to remove any residual helium that may otherwise saturate inspection areas.

Figure 5:
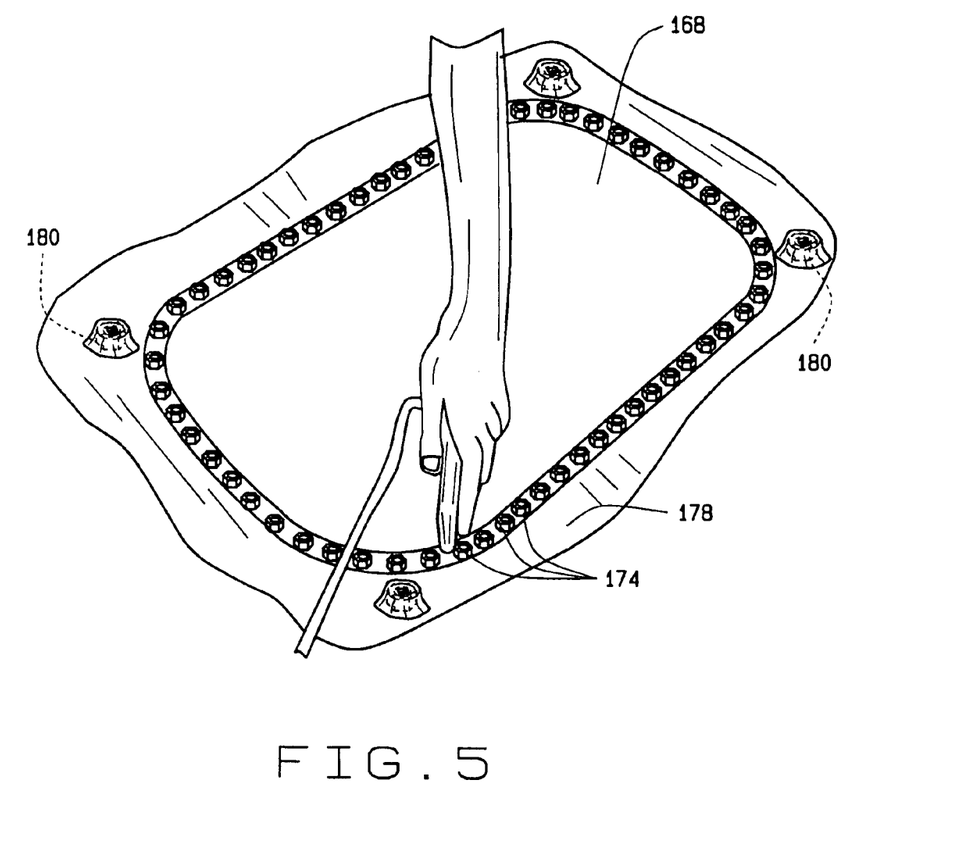
FIG. 5 is a perspective view illustrating fittings of a fuel tank access door being sealed to ensure a fluid tight seal around the fittings thereby sealing off the cavity in which the fuel tank is positioned according to a preferred embodiment of the invention.

In an exemplary operation, the system 100 can be used as follows to test a fuel tank 104 for leaks and to also locate the point or points of origin of leaks, if any do exist. The cavity annulus 124 is sufficiently sealed in a substantially fluid tight manner. This sealing allows the cavity annulus 124 to be sufficiently pressurized with pressurized fluid from the source 112 for causing pressurized fluid to flow from the cavity annulus 124 through a leak 108, 108' into the fuel cell 104. As shown in FIGS. 1 and 5, the access door fitting 176 is sealed against aircraft structure to ensure a generally fluid tight seal. Bolts 174 are installed to secure the door 168 against the dorsal deck 178. The corner bolts 180 are sealed off, for example with a putty type substance applied over the corner bolts 180 so as to form a generally fluid tight seal between the corner bolts 180 and the dorsal deck 178.

If the aircraft has been fueled, the fuel tank 104 must be emptied of fuel and made safe for entry and inspection therein (e.g., purged, de-puddled, sniff checked and certified safe for entry/inspection, etc.).

To conserve helium, the sufficiency of the sealing of the cavity annulus 124 may be tested or verified prior to introducing the helium gas into the cavity annulus 124. For example, a preferably less expensive pressurized fluid (e.g., nitrogen (N₂), shop air, etc.) can be injected into the cavity annulus 124 through the cavity drain 116 so as to pressurize the cavity to about 0.50 psig. While pressurized, the cavity annulus 124 can be monitored for leaks. Any apparent leaks can then be sealed so as to ensure that the cavity annulus 124 can be pressurized sufficiently. After it has been determined that the cavity annulus 124 has been adequately sealed, the nitrogen, shop air, or other pressurized fluid can be removed from the cavity annulus 124.

The helium supply line 120 is connected to the cavity drain 116. The fuel tank 104 can be pressurized with the helium via the cavity drain 116, preferably to about 0.50 psig. The supply valve or regulator 136 for the source 112 can be slowly closed, and the pressure gages 140 monitored.

A determination can then be made as to whether the fuel tank 104 displays pressure sufficient to perform the testing. It should be noted, however, that some amount of leakage may occur out of the cavity annulus 124, which is allowable so long as the fuel tank 104 is sufficiently pressurized. Sufficient pressurization of the fuel tank 104 can be determined, for example, by pushing on a fuel tank wall 180 and verifying that a cushion of helium is present within the cavity annulus 124.

The helium pressure at the tank's cavity drain 116 can be regulated to about 0.50 psig. The seal at the upper door flange can be slightly broken by loosening one or more of the bolts 174. Verification that helium pressure is surrounding the fuel tank outer wall can be obtained by visually verifying that the fuel tank walls are slightly imploded inward from the helium pressure external thereto.

The helium detector 148 is positioned within the fuel tank 104 to sniff for helium. When helium is detected, for example, in a range of about 20 to 30 thousand parts-per-millions (e.g., by using a low sensitive setting on the helium detector 148), the loosened bolts 174 are re-tightened.

The fuel tank plumbing and pressure decay caps, if previously installed should be removed from the internal fuel tank fittings.

Assuming that the fuel tank 104 has been declared safe, the fuel tank 104 can be entered with the helium leak detector equipment, which is preferably an intrinsically safe leak detector probe suitable for use even with aircraft that have been fueled.

The helium detector 148 is used to sniff around fittings and connectors 164 (FIGS. 1, 2, and 8) and fuel tank walls 180 (FIG. 1) while allowing sufficient response time for the detector 148 to detect helium, such as ten (10) seconds per location. It is generally preferred to start low in the tank 104 and work upwardly because helium rises. The blower 170 can provide continuous airflow 172 into and out of the tank 104 during the helium detection/sniffing process so as to remove any residual helium that may otherwise saturate inspection areas.

After a leak has been located (see FIGS. 1, 2, and 8) in a fitting or connection, the defective O-ring(s) can be replaced as needed. If a leak 108 is located in a tank wall 180 (FIG. 1), the wall 180 can be repaired in accordance with the applicable requirements. The O-ring replacement and/or tank wall repair can take place without having to remove the tank 104 from the aircraft. After replacement of the O-rings and/or tank repair, the helium detector 148 should be used to validate the repairs, i.e. confirm that the new O-ring(s) and/or repaired tank wall does not leak.

Upon completion of the testing process, the test equipment is removed from the aircraft, and the aircraft is configured to its original pretest condition.

Figure 6:
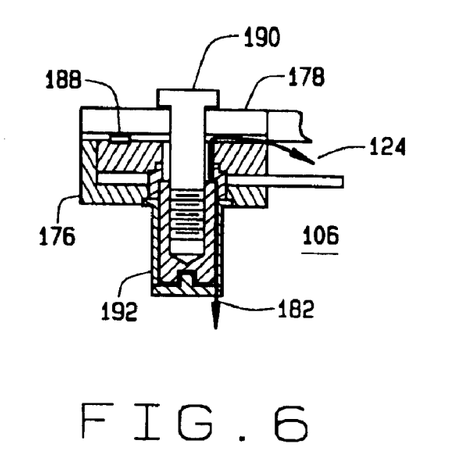
FIG. 6 is a cross-sectional view of a fuel tank fitting having a defective weld which defines a leak path.
Figure 7:
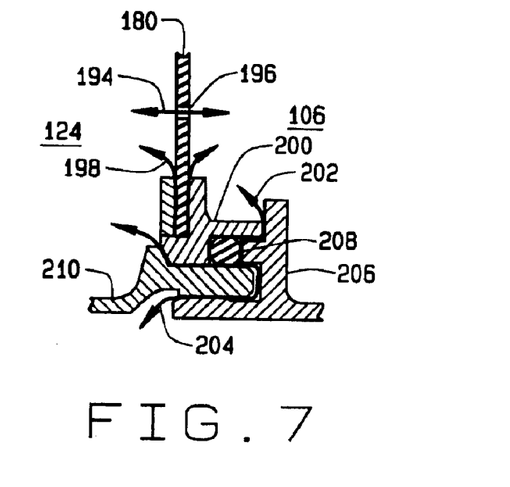
FIG. 7 is a cross-sectional view of a fuel tank fitting illustrating various leak paths.
Figure 8:
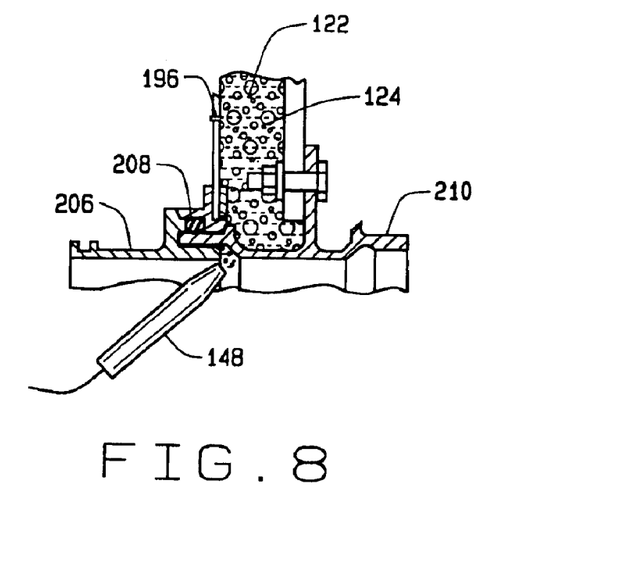
FIG. 8 is a cross-sectional view of a fuel tank fitting and illustrating a helium detector positioned to detect helium leakage through a leak path defined by the fitting according to a preferred embodiment of the invention.

As shown in FIGS. 6, 7, and 8, various leak paths may be defined between the cavity annulus 124 and the interior 106 of the fuel tank 104. For example, FIG. 6 illustrates a leak path (represented by the arrow 182) defined by a defective weld. In FIG. 6, there is also shown an access door fitting 176, a sealing member 188, a bolt 190 passing through the dorsal deck 178, and a dome nut 192 engaged with the bolt 190.

By way of further example, FIG. 7 illustrates additional leak paths which may be defined between the cavity annulus 124 and the interior 106 of the fuel tank 104. As shown, a leak path 194 is defined through a hole 196 in the tank wall 180 (e.g., rubber bladder or gland). A leak path 198 is defined between the tank wall 180 and the fitting 200. Leaks paths 202 and 204 are defined between the bladder fitting 200, retainer 206, O-ring 208, and bulkhead fitting 210.

Accordingly, embodiments of the invention are relatively simple-to-use and highly efficient at detecting and locating leaks in internal pressure vessels. When used in conjunction with aircraft, various embodiments provide significant cost and time savings in locating leaks in fuel tanks internally installed in aircraft by eliminating the need to remove fuel tanks from aircraft that have displayed leakage and also by removing the costs and downtime associated with returning a leaking fuel tank to the supplier for repair. Instead, such embodiments allow the leak to be located and repaired while the fuel tank remains within the aircraft structure. With embodiments of the invention, isolation and location of leaks can be accomplished without complete removal of the internal plumbing or the fuel tank and without having to add plugs or caps to the internal fuel tank fittings.

The invention is applicable to a wide range of internal pressure vessels. Accordingly, the specific references to aircraft, fuel tank and fuel cell herein should not be construed as limiting the scope of the present invention, as embodiments of the invention could be applied in any implementation where a highly efficient process for detecting and/or locating leaks in an internal pressure vessel is desirable regardless of whether the internal pressure vessel is associated with a mobile platform (e.g., aircraft, ship, etc.) or a fixed or non-mobile platform. Indeed, embodiments of the invention can be beneficial to any person or entity which deals with installation, removal and repair of internal pressure vessels.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A method of detecting leaks in a fuel tank without having to remove the fuel tank from the mobile platform, the fuel tank being disposed within a cavity defined by mobile platform supporting structure, the method comprising:
    sealing a cavity annulus defined generally between the fuel tank and the mobile platform supporting structure;
    introducing pressurized fluid into the cavity annulus to cause pressurized fluid to flow from the cavity annulus through a leak into the fuel tank;
    monitoring the fuel tank to detect leakage of pressurized fluid into the fuel tank; and
    wherein the fuel tank remains disposed within the cavity defined by the mobile platform supporting structure during said sealing, introducing, and monitoring.

2. The method of claim 1, wherein:
    the introducing comprises introducing helium into the cavity annulus; and
    the monitoring comprises using a helium detection device within the fuel tank to detect helium leakage into the fuel tank.

3. The method of claim 1, further comprising repairing detected leaks without removing the fuel tank from the cavity defined by the mobile platform supporting structure.

4. The method of claim 1, wherein the monitoring comprises locating an origin of pressurized fluid leakage into the fuel tank.

5. The method of claim 4, wherein the locating comprises:
    isolating a portion within the fuel tank; and
    detecting leakage of pressurized fluid into the isolated portion.

6. The method of claim 5, wherein
    the isolating comprises positioning an isolation cup over a fitting within the fuel tank; and
    the detecting comprises using a detection device in communication with the isolation cup to detect leakage of pressurized fluid into the isolation cup.

7. The method of claim 6, further comprising removably coupling a corresponding one of a plurality of isolation cups to the detection device.

8. The method of claim 1, further comprising testing the sufficiency of the sealing of the cavity annulus.

9. The method of claim 8, wherein the testing comprises:
    introducing a different pressurized fluid into the cavity annulus; and
    monitoring the pressurized cavity annulus for leaks.

10. The method of claim 1, wherein the mobile platform comprises an aircraft.

11. A method of detecting leaks in an internal pressure vessel, the method comprising:
    forming a pressurizing cavity external to and adjacent the internal pressure vessel;
    testing the pressurization sufficiency of the pressurizing cavity, the testing including introducing pressurized fluid into the pressurizing cavity and monitoring the pressurizing cavity for leaks;
    introducing a different pressurized fluid into the pressurizing cavity to cause the different pressurized fluid to flow from the cavity through a leak into the internal pressure vessel; and
    monitoring the internal pressure vessel to detect leakage of the different pressurized fluid into the internal pressure vessel.

12. The method of claim 11, wherein the internal pressure vessel is disposed and remains disposed within a cavity defined by supporting structure during said forming, introducing, and monitoring.

13. The method of claim 12, wherein:
    the forming comprises sealing a cavity annulus defined generally between the internal pressure vessel and the supporting structure; and
    the introducing comprises introducing pressurized fluid into the cavity annulus.

14. The method of claim 12, further comprising repairing detected leaks without removing the internal pressure vessel from the cavity defined by the supporting structure.

15. The method of claim 11, wherein:
    the introducing a different pressurized fluid comprises introducing helium into the pressurizing cavity; and
    the monitoring comprises using a helium detection device within the internal pressure vessel to detect helium leakage into the internal pressure vessel.

16. The method of claim 11, wherein the monitoring comprises locating an origin of pressurized fluid leakage into the internal pressure vessel.

17. The method of claim 16, wherein the locating:
    isolating a portion within the internal pressure vessel; and
    detecting leakage of pressurized fluid into the isolated portion.

18. The method of claim 17, wherein
    the isolating comprises positioning an isolation cup over a fitting within the internal pressure vessel; and
    the detecting comprises using a detection device in communication with the isolation cup to detect leakage of pressurized fluid into the isolation cup.

19. The method of claim 18, further comprising removably coupling a corresponding one of a plurality of isolation cups to the detection device.

20. The method of claim 11, wherein the internal pressure vessel comprises an internal fuel tank.

21. A method of locating leaks in an internal pressure vessel without having to remove the internal pressure vessel from a cavity defined by supporting structure in which the internal pressure vessel is disposed, the method comprising:
    sealing a cavity annulus defined generally between the internal pressure vessel and the supporting structure;

introducing pressurized fluid into the cavity annulus to cause pressurized fluid to flow from the cavity annulus through a leak into the internal pressure vessel;

positioning an isolation cup over a fitting within the internal pressure vessel;

using a detection device in communication with the isolation cup to detect leakage of pressurized fluid into the isolation cup; and wherein the internal pressure vessel remains disposed within the cavity defined by the supporting structure during said sealing, introducing, positioning, and using.

22. The method of claim 21, further comprising removably coupling a corresponding one of a plurality of isolation cups to the detection device.

23. The method of claim 21, wherein the introducing comprises introducing helium into the cavity annulus.

24. The method of claim 23, further comprising repairing detected leaks without removing the internal pressure vessel from the cavity defined by the supporting structure.

* * * * *

UNITED STATES PATENT AND TRADEMARK OFFICE
Certificate

Patent No. 6,886,389 B1                                                    Patented: May 3, 2005

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Charles E. Hagar, Manchester, MO (US); Laurent Dumortier, Targon (FR); and Michael J. Evans, Nashville, TN (US).

Signed and sealed this Eighth Day of June 2010.

LISA CAPUTO
*Supervisory Patent Examiner*
Art Unit 1797

UNITED STATES PATENT AND TRADEMARK OFFICE
Certificate

Patent No. 6,886,389 B1                                                                         Patented: May 3, 2005

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Charles E. Hagar, Manchester, MO (US); Laurent Dumortier, Targon (FR); and Michael J. Evans, Nashville, TN (US).

Signed and Sealed this Sixth Day of July 2010.

<div style="text-align:right">

LISA CAPUTO
*Supervisory Patent Examiner*
Art Unit 2855

</div>